United States Patent
Park et al.

(10) Patent No.: US 9,955,146 B2
(45) Date of Patent: Apr. 24, 2018

(54) DISPLAY DEVICE AND DRIVING METHOD THEREOF

(71) Applicant: SAMSUNG DISPLAY CO., LTD., Yongin-si, Gyeonggi-do (KR)

(72) Inventors: Soo-Ran Park, Suwon-si (KR); Sang-Myeon Han, Hwaseong-si (KR); Kwang-Sub Shin, Seongnam-si (KR); Baek-Woon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 574 days.

(21) Appl. No.: 14/464,681

(22) Filed: Aug. 20, 2014

(65) Prior Publication Data

US 2015/0245018 A1 Aug. 27, 2015

(30) Foreign Application Priority Data

Feb. 21, 2014 (KR) .......................... 10-2014-0020361

(51) Int. Cl.
*H04N 13/04* (2006.01)
*H04N 13/00* (2018.01)

(52) U.S. Cl.
CPC ..... *H04N 13/0438* (2013.01); *H04N 13/0497* (2013.01); *H04N 13/0029* (2013.01); *H04N 2013/0463* (2013.01)

(58) Field of Classification Search
CPC . H01J 47/02; H04N 13/0438; H04N 13/0497; H04N 2013/0463; H04N 13/0029; A61B 6/032
USPC .......................................................... 348/53
See application file for complete search history.

(56) References Cited

U.S. PATENT DOCUMENTS

| | | | |
|---|---|---|---|
| 6,188,442 B1* | 2/2001 | Narayanaswami | H04N 13/0048 345/7 |
| 2010/0118128 A1* | 5/2010 | Choi | H04N 13/0438 348/53 |
| 2010/0238274 A1* | 9/2010 | Kim | H04N 13/0018 348/51 |
| 2011/0310221 A1* | 12/2011 | Meuninck | H04N 13/0436 348/43 |
| 2012/0069164 A1 | 3/2012 | Nakagawa et al. | |
| 2012/0127287 A1 | 5/2012 | Redmann | |
| 2013/0141402 A1 | 6/2013 | Lee | |

FOREIGN PATENT DOCUMENTS

| | | |
|---|---|---|
| KR | 10-2011-0139276 A | 12/2011 |
| KR | 10-2012-0089440 A | 8/2012 |
| KR | 10-2013-0001106 A | 1/2013 |
| KR | 10-2013-0063174 A | 6/2013 |

* cited by examiner

*Primary Examiner* — William C Vaughn, Jr.
*Assistant Examiner* — Naod Belai
(74) *Attorney, Agent, or Firm* — Lewis Roca Rothgerber Christie LLP

(57) ABSTRACT

A display device comprises a signal processor configured to generate left-eye and right-eye image data according to an input image signal, a frame rate controller configured to generate a plurality of left-eye and right-eye image data from the left-eye and right-eye image data according to an output frequency, a data formatter configured to alternately organize the plurality of left-eye and right-eye image data generated by the frame rate controller, and a display unit configured to sequentially display the plurality of left-eye and right-eye image data organized by the data formatter.

7 Claims, 5 Drawing Sheets

DISPLAY DEVICE AND DRIVING METHOD THEREOF

CROSS-REFERENCE TO RELATED APPLICATION

This application claims priority to and the benefit of Korean Patent Application No. 10-2014-0020361, filed on Feb. 21, 2014, with the Korean Intellectual Property Office, the disclosure of which is incorporated herein in its entirety by reference.

BACKGROUND

1. Field

Embodiments of the present invention relate to a display device for improving distortion in 3D stereoscopic images, and to a driving method thereof.

2. Description of the Related Art

In general, a display device includes a plurality of pixels provided in an area defined by a black matrix or a pixel defining layer. The display device is categorized into a liquid crystal display (LCD), an organic light emitting display (or an organic light emitting diode (OLED) display), a plasma display panel (PDP), and the like depending on the type of the display substrate.

As examples for methods of driving the display device, there are a sequential driving method receiving data signals in response to scan signals sequentially applied to a plurality of pixels and emitting lights from the pixels in order of data signal arrival, and a simultaneous emission with active voltage method receiving the data signals for one frame and emitting light from all the pixels simultaneously. A frame period of the display device driven in the simultaneous emission with active voltage method includes a non-emission period where the data is written and an emission period where the pixels emit light in accordance with the written data.

Meanwhile, there has been a growing demand and interest for 3D stereoscopic images. In general, the 3D stereoscopic images are based on a stereo vision principle of two eyes. A parallax between two eyes, namely binocular parallax caused by two eyes spaced about 65 mm apart, is a primary factor in human perception of stereoscopic vision, and in a case where left and right eyes are presented with corresponding echo-planar images respectively, a brain can combine two different images, thereby discerning a difference in depth and perceiving a strong sense of presence from the 3D stereoscopic images.

As methods of displaying the 3D stereoscopic images, there are a passive method and an active method. The passive method provides two separate images for the left and right eyes by using a polarizing filter. Another approach for the passive method is to view through glasses with red and blue lenses for respective eyes.

The active method uses shutter glasses separating the left and right eyes, such that images for the right eye and images for the left eye can be separated by blocking each of the left and right eyes in alternating sequence. In other words, temporarily split images are repeated periodically, and the glasses installed with an electronic shutter synchronized to the period are used for viewing. Therefore the method is also called a time split type or a shutter glass type.

In a case where the active method is used for viewing the 3D stereoscopic images, when a left shutter of the shutter glasses is open, only the image for the left eye should be presented, however, problems with this method arise because the image for the right eye is partly shown on the screen. Such interference from other image data on the original image data displayed on the screen is called crosstalk. Further, the temporal differences between the images for the left and right eyes can cause headache or fatigue, and this effect is called flicker.

In a case where the display is driven by the simultaneous emission with active voltage method, a frame includes the emission period and the non-emission period, such that crosstalk phenomenon can be offset in part. However, the problem of flicker caused by the temporal differences between the images for the left and right eyes still remains.

SUMMARY

Aspects of embodiments of the present invention are directed to a display device driven by a concurrent (e.g., simultaneous) emission with active voltage method and to a driving method thereof, in which an output sequence of stereoscopic image data and concurrent (e.g., simultaneous) emission timing of the display are controlled, thereby resulting in improved crosstalk and flicker phenomenon in 3D stereoscopic image realization.

According to an embodiment of the present invention, a display device may include: a signal processor configured to generate left-eye and right-eye image data according to an input image signal; a frame rate controller configured to generate a plurality of left-eye and right-eye image data from the left-eye and right-eye image data according to an output frequency; a data formatter configured to alternately organize the plurality of left-eye and right-eye image data generated by the frame rate controller; and a display unit configured to sequentially display the plurality of left-eye and right-eye image data organized by the data formatter.

The display unit may be configured to operate with a concurrent emission method in which one frame includes an emission period and a non-emission period.

A timing controller may be configured to control emission timing during the emission period.

The timing controller may be further configured to adjust a time interval between the emission period of the plurality of left-eye image data and the emission period of the plurality of right-eye image data.

The timing controller may be further configured to adjust a time interval between the emission period of one stereoscopic image and the emission period of another stereoscopic image to be longer than a time interval between the emission periods of image data forming one stereoscopic image from among the plurality of left-eye and right-eye image data.

The timing controller may be further configured to adjust a time interval between the emission period of the plurality of left-eye and right-eye image data perceived by a first viewer and the emission period of the plurality of left-eye and right-eye image data perceived by a second viewer to be longer than a time interval between the emission period of each left-eye and right-eye image data of the plurality of left-eye and right-eye image data perceived by the first viewer or the second viewer.

The display device may further include shutter glasses configured to open and close shutters of the shutter glasses according to the plurality of left-eye and right-eye image data sequentially displayed on the display unit.

The shutter glasses may include a mode selection unit configured to select from a 3D mode and 2D mode, and from a single mode, dual mode, and quad mode.

According to an embodiment of the present invention, a method of driving a display device may include: receiving an image signal; generating left-eye and right-eye image data based on the received image signal; generating a plurality of left-eye and right-eye image data from the left-eye and right-eye image data according to an output frequency; alternately organizing the plurality of left-eye and right-eye image data according to an output format; and sequentially displaying the organized plurality of left-eye and right-eye image data at a display unit.

The sequentially displaying the organized plurality of left-eye and right-eye image data may include adjusting a time interval between an emission period of the left-eye image data of the plurality of left-eye and right-eye image data and the emission period of the right-eye image data of the plurality of left-eye and right-eye image data.

The sequentially displaying the organized plurality of left-eye and right eye image data may include adjusting a time interval between an emission period of one stereoscopic image and the emission period of another stereoscopic image to be longer than a time interval between the emission periods of image data forming one stereoscopic image from amount the plurality of left-eye and right-eye image data.

The sequentially displaying the organized plurality of left-eye and right-eye image data may include adjusting a time interval between an emission period of the plurality of left-eye and right-eye image data perceived by a first viewer and an emission period of the plurality of left-eye and right-eye image data perceived by a second viewer to be longer than a time interval between the emission period of each left-eye and right-eye image data of the plurality of left-eye and right-eye image data perceived by the first viewer or the second viewer.

The foregoing summary is illustrative only and is not intended to be limiting in any way. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present invention will be more clearly understood from the following detailed description taken in conjunction with the accompanying drawings, in which.

DETAILED DESCRIPTION

Figure 1:
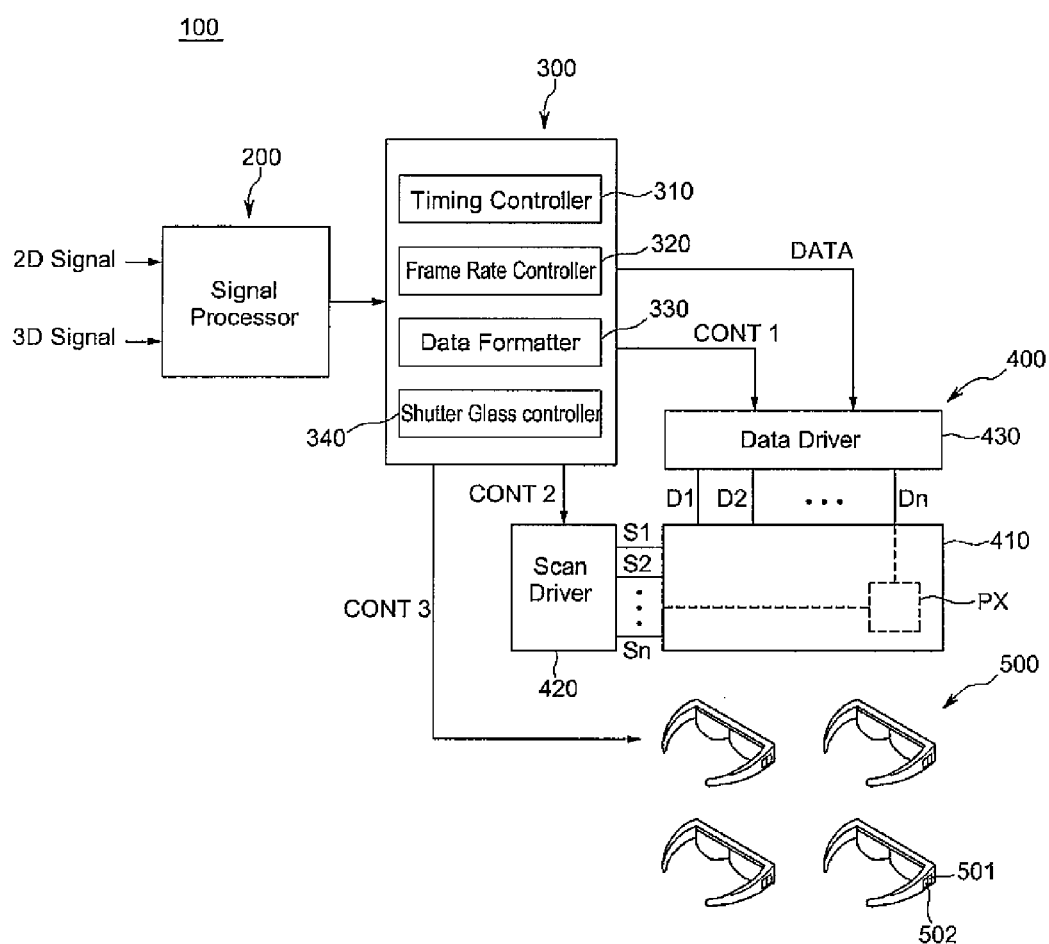
FIG. 1 is a schematic block diagram showing a stereoscopic image display device according to an embodiment of the present invention.

Hereinafter, embodiments of the present invention will be described in more detail with reference to the accompanying drawings.

Although the present invention can be modified in various manners and have several embodiments, specific embodiments are illustrated in the accompanying drawings and will be described in the specification. However, the scope of the present invention is not limited to the specific embodiments and should be construed as including all the changes, equivalents, and substitutions included in the spirit and scope of the present invention.

Throughout the specification, when an element is referred to as being "connected" or "coupled" to another element, the element is "directly connected" or "directly coupled" to the other element, or "electrically connected" or "electrically coupled" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Some of the parts which are not associated with the description may not be provided in order to specifically describe embodiments of the present invention, and like reference numerals refer to like elements throughout the specification.

FIG. 1 is a schematic block diagram showing a stereoscopic image display device according to an embodiment of the present invention.

Referring to FIG. 1, a display device 100 according to an embodiment of the present invention includes a signal processor 200, a control unit 300, a display unit 400, and shutter glasses 500.

The signal processor 200 performs general data processing for inputted image signal. The signal processor 200 may be, for example, a digital television receiver processing a digital broadcast signal. General data processing refers to a sequence of data processing including tuning in to a channel to which a digital broadcast signal is transmitted, receiving the digital broadcast signal over the tuning channel, demodulating and demultiplexing the received digital broadcast signal, and decoding the demultiplexed digital broadcast signal.

According to an embodiment, the signal processor 200 performs the general data processing for 3D image data (e.g., in a 3D image signal), and then processes the 3D image data to produce left-eye and right-eye data.

According to another embodiment, the signal processor 200 receives and processes not only the 3D image data, but also 2D image data (e.g., in a 2D image signal). Therefore, when the 2D image data is inputted instead of the 3D image data, the inputted 2D image data can be processed by bypassing a data formatter 330 described below.

A control unit 300 includes a timing control unit (or a timing controller) 310, a frame rate control unit (e.g., a frame rate controller or a frame rate converter) 320, the data formatter 330, and a shutter glasses control unit (or a shutter glasses controller) 340.

The timing control unit 310 controls driving timing for each drive unit (or driver) of a display unit 400 described below in accordance with a synchronization signal and a clock signal applied from outside. The synchronization signal may be classified into a vertical synchronization signal Vsync for splitting a series of frame and a horizontal synchronization signal Hsync for setting drive activation timing for each pixel. The timing control unit 310 generates a data drive control signal CONT1 and a scan drive control signal CONT2 in response to the synchronization signal. A shutter glasses control signal CONT3 for controlling opening and shutting of shutter glasses 500 described below is also generated.

In addition, the timing control unit 310 determines timings to establish an emission period and a non-emission period in a frame period.

The frame rate control unit 320 processes a frequency of the image data transmitted from the signal processor 200 to match an output frequency of the display unit 400. For example, in a case where image data transmitted from the signal processor 200 has a frequency of 60 Hz and the display unit 400 has an output frequency of 120 Hz or 240 Hz, the frame rate control unit 320 processes the inputted image data frequency of 60 Hz to match the output frequency of 120 Hz or 240 Hz according to one or more suitable methods known to those skilled in the art. The methods known to those skilled in the art may include, for example, a method of temporal interpolation of the inputted image signal and a method of simply repeating frames of the inputted image signal.

When the temporal interpolation method is used to match the frequency, the inputted image data having a frequency of 60 Hz is quadrisected (0, 0.25, 0.5, 0.75) to produce image data having a frequency of 240 Hz. When the method of simply repeating frames of the inputted image signal is used to match the frequency, each frame of the inputted 60 Hz image data is repeated four times to match the 240 Hz frequency.

The data formatter 330 organizes the image data processed to match the output frequency of the display unit 400 by the frame rate control unit 320 in accordance with a 2D/3D mode and a viewer mode corresponding to the number of viewers, and then outputs the organized image data to the display unit 400.

In a case where the 3D image data organized by the data formatter 330 is displayed on the display unit 400, the shutter glasses control unit 340 controls opening and shutting of the shutter glasses 500, such that the shutter glasses 500 can be used for viewing the 3D image. In other words, the shutter glasses control unit 340 controls opening and shutting of the shutter glasses 500, such that the shutter glasses 500 are synchronized to the output sequence of the image data organized by the data formatter 330 and the output timing of the image data to be displayed on the display unit 400.

In the shutter glasses 500, shutters for both eyes may be open and closed together or a shutter for the left eye and a shutter for the right eye may be open and closed separately.

In other words, the shutters for both eyes may be open and closed concurrently (e.g., simultaneously) or the shutter for the left eye and the shutter for the right eye may be open and closed alternately.

In some embodiments, the shutter glasses 500 include mode selecting units (or mode selectors) 501 and 502. The shutter glasses 500 can transmit, for example, a 3-bit signal by using the mode selecting units 501 and 502. According to an embodiment, a single viewer 3D mode, a dual viewer 3D mode, and a quad viewer 2D mode can be selected for the shutter glasses by using the mode selecting units 501 and 502.

The display unit 400 includes a display substrate 410 including a plurality of pixels PX arranged in a matrix form having an orthogonal arrangement of rows and columns, a scan drive unit (or a scan driver) 420 configured to apply a scan signal to each pixel PX, and a data drive unit (or a data driver) 430 configured to apply a data signal to each pixel PX.

The display unit 400 according to an embodiment of the present invention is driven by a concurrent (e.g., simultaneous) emission with active voltage method. The concurrent (e.g., simultaneous) emission with active voltage method refers to a method where the plurality of pixels of one frame concurrently (e.g., simultaneously) emit light, such that images forming the corresponding frame can be displayed on the display unit at a time.

Therefore, a frame period of the display unit 400 driven in the concurrent (e.g., simultaneous) emission with active voltage method includes the non-emission period where data is written and the emission period where the pixels emit light in accordance with the written data. In this case, the non-emission period may be half of one frame period or less. Likewise, the emission period may also be half of one frame period or less.

The scan drive unit 420 receives the scan drive control signal CONT2 from the control unit 300, and then generates the plurality of scan signals. The scan drive unit 420 sequentially supplies the plurality of scan signals to each of a plurality of scan line (S1~Sn).

The data drive unit 430 receives the data drive control signal CONT1 from the control unit 300, and then transmits a plurality of data signal DATA in accordance with the image data processed by the data formatter 330 to respective pixel of the display unit 400.

Figure 2:
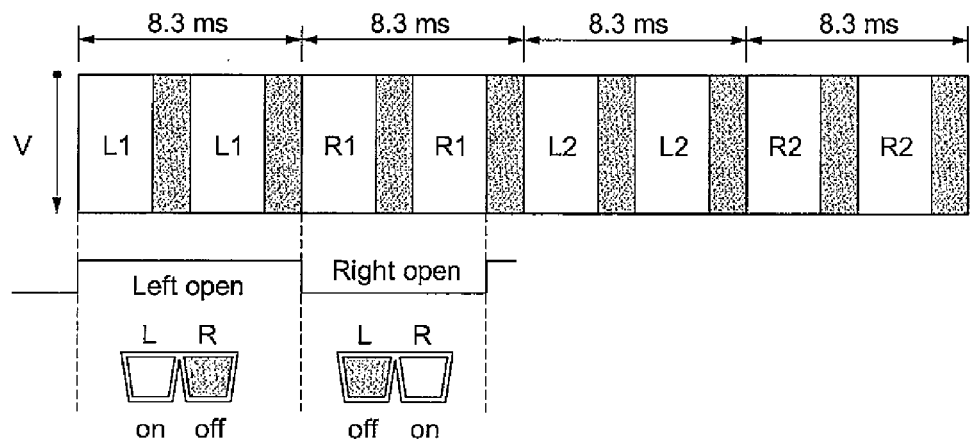
FIG. 2 is a timing chart illustrating a conventional method of organizing 3D image data in a single viewer 3D mode.

FIG. 2 is a timing chart illustrating a conventional method of organizing 3D image data in a single viewer 3D mode. In detail, FIG. 2 illustrates a state where the 3D image data organized in the single viewer 3D mode by a data formatter 330 is displayed on each frame of a display unit 400 driven by a concurrent (e.g., simultaneous) emission with active voltage method. In FIG. 2, x-axis represents time, whereas y-axis represents position in a vertical direction. The display unit 400 has a 240 Hz output frequency, and is driven by the concurrent (e.g., simultaneous) emission with active voltage method. Therefore, a frame period (4.15 ms) includes an emission period and a non-emission period.

The data formatter 330 organizes the 3D image data by alternately arranging left-eye image data L1, L2 . . . and right-eye image data R1, R2 . . . so as to realize the single viewer 3D stereoscopic image, and then outputs the organized 3D image data to the display unit 400. The organized 3D image data is sequentially displayed on the display unit 400 having the 240 Hz output frequency, and shutter glasses 500 having a 240 Hz operating frequency, which is the same as the output frequency of the display unit 400, for opening and shutting of left-eye and right-eye shutters.

For example, the 3D image data is organized to have an arrangement of L1-R1-L2-R2 and displayed on the display unit 400 having the 240 Hz output frequency, and the shutter glasses 500 are operated at the 240 Hz frequency for opening and shutting the left-eye and right-eye shutters, thereby realizing the single viewer 3D stereoscopic image.

However, it is difficult to make the shutter glasses 500 operate at such a fast period of 240 Hz for opening and shutting the shutters, and thus problems of crosstalk and low luminance has arisen. Therefore, in the conventional single viewer, 3D mode, in order to reduce the problems of the crosstalk and low luminance, the 3D image data is organized in a way where the shutter glasses 500 have a 120 Hz shutter opening frequency, which is relatively lower than the output frequency of 240 Hz.

In other words, the data formatter 330 alternately organizes the left-eye image data L1, L2 ... and the right-eye image data R1, R2 ... in the conventional single viewer 3D mode, and in this case, the same image data is repeated to form the 3D image data, and then the organized 3D image data is transmitted to the display unit 400. The organized 3D image data is sequentially displayed on the display unit 400 having the 240 Hz output frequency, and the shutter glasses 500 are operated at the 120 Hz shutter opening frequency, which is lower than the output frequency of the display unit 400.

For example, the 3D image data is organized to have an arrangement of L1-L1-R1-R1-L2-L2-R2-R2 as illustrated in FIG. 2, and then sequentially displayed on the display unit 400 having the 240 Hz output frequency, and thus the shutter glasses 500 can realize the single viewer 3D stereoscopic image at the left-eye and right-eye shutter opening frequency of 120 Hz.

In other words, the same image data such as L1-L1 or R1-R1 is repeated for a series of the frame, therefore the 3D image data can be viewed with the shutter glasses 500 having the 120 Hz shutter opening frequency, which is lower than the 240 Hz output frequency of the display unit 400. Therefore, problems of the crosstalk and low contrast can be solved.

However, the 3D stereoscopic image is consequently operated at the 120 Hz frequency, such that the merit of the display unit 400 capable of being driven at the 240 Hz frequency can be lost, and further the display device may be become vulnerable to flicker and depth distortion in the 3D stereoscopic image realization.

That is, time for which the left-eye image data L1 is memorized and the right-eye image data R1 is newly received is 8.3 ms, and thus although the display unit 400 can be driven at 240 Hz, the display unit 400 is driven at 120 Hz in the 3D mode.

Therefore, embodiments of the present invention provide a data driving method so as to solve the problems of the crosstalk and low contrast and also reduce the flicker and depth distortion.

Figure 3:
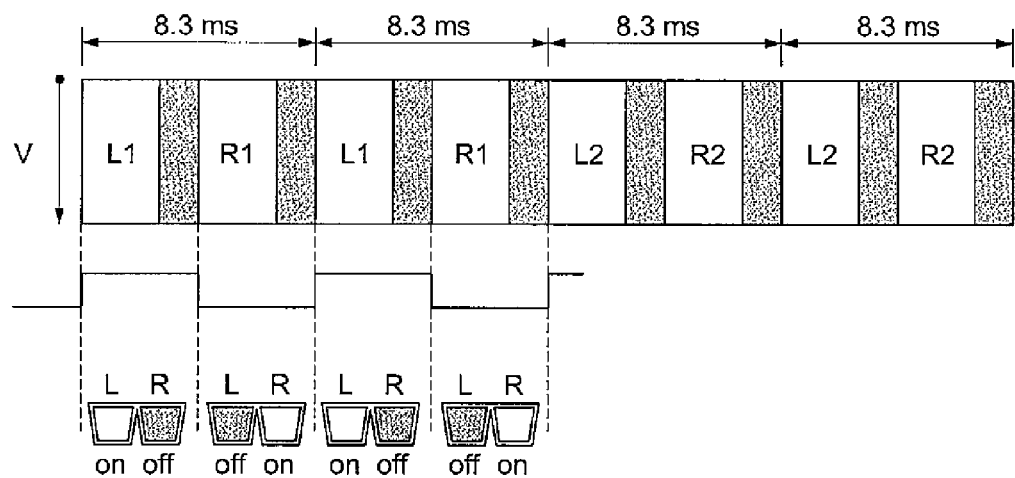
FIG. 3 is a timing chart illustrating a method of organizing the 3D image data in the single viewer 3D mode according to an embodiment of the present invention.

FIG. 3 is a timing chart illustrating a method of organizing 3D image data in a single viewer 3D mode according to an embodiment of the present invention. In detail, FIG. 3 is a diagram illustrating a state where 3D image data organized by a data formatter 330 is displayed on each frame of a display unit 400 driven by a concurrent (e.g., simultaneous) emission with active voltage method. In FIG. 3, x-axis represents time, whereas y-axis represents position in a vertical direction. The display unit 400 has a 240 Hz output frequency, and is driven by the concurrent (e.g., simultaneous) emission with active voltage method. Therefore, a frame period e.g., 4.15 ms includes an emission period and a non-emission period.

In the single viewer 3D mode according to an embodiment of the present invention, the data formatter 330 alternately organizes left-eye image data L1, L2 ... and right-eye image data R1, R2 ..., and in more detail, a set L1-R1 of the left-eye image data L1 and the right-eye image data R1 is repeated in a series to form the 3D image data, and the organized 3D image data is transmitted to the display unit 400. The organized 3D image data is sequentially displayed on the display unit 400 having a 240 Hz output frequency, and shutter glasses 500 are operated at a 240 Hz frequency which is the same as the output frequency of the display unit 400.

For example, the 3D image data is organized to have an arrangement of L1-R1-L1-R1-L2-R2-L2-R2 and is sequentially displayed on the display unit 400 having the 240 Hz output frequency, and thus the shutter glasses 500 are operated at the left-eye and right-eye shutter opening and shutting frequency of 240 Hz, such that the single viewer 3D stereoscopic image is realized according to an embodiment of the present invention.

In a case of the conventional single viewer 3D image data arrangement of L1-L1-R1-R1-L2-L2-R2-R2, time between the left-eye image data L1 and the right-eye image data R1 (e.g., the time period from the beginning of the first L1 in FIG. 2 to the beginning of the first R1) is 8.3 ms. To the contrary, in a case of the 3D image data arrangement of L1-R1-L1-R1-L2-R2-L2-R2 according to an embodiment of the present invention, time between the left-eye image data L1 and the right-eye image data R1 (e.g., the time period from the beginning of L1 to the beginning of R1) is reduced to 4.15 ms, such that flicker phenomenon can be prevented.

In some embodiments, the same image data is repeated for the series of frame like L1-R1 and L1-R1, and thus the problems of the crosstalk and low contrast can be solved.

Figure 4:
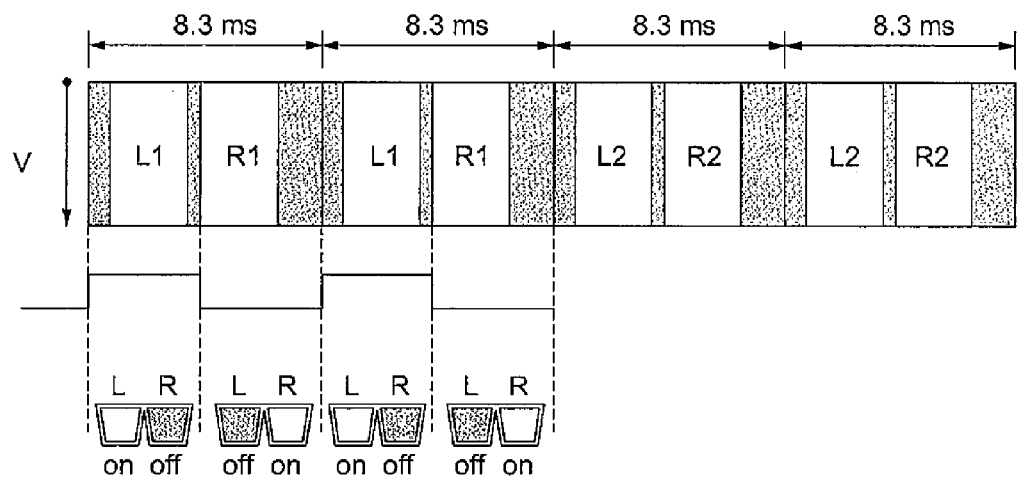
FIG. 4 is a timing chart illustrating a method of organizing the 3D image data in the single viewer 3D mode according to another embodiment of the present invention.

FIG. 4 is a timing chart illustrating a method of organizing 3D image data in a single viewer 3D mode according to another embodiment of the present invention. In more detail, FIG. 4 is a diagram illustrating a state where 3D image data organized by a data formatter 330 is displayed on each frame of a display unit 400 driven by a concurrent (e.g., simultaneous) emission with active voltage method. In FIG. 4, x-axis represents time, whereas y-axis represents position in the vertical direction. The display unit 400 has a 240 Hz output frequency, and is driven by the concurrent (e.g., simultaneous) emission with active voltage method. Therefore, a frame period (4.15 ms) includes an emission period and a non-emission period.

In the single viewer 3D mode according to another embodiment of the present invention, the 3D image data is organized to have an arrangement of L1-R1-L1-R1-L2-R2-L2-R2 and is sequentially displayed on the display unit 400 having a 240 Hz output frequency, and thus the shutter glasses 500 are operated at a left-eye and right-eye shutter opening and shutting frequency of 240 Hz.

In some embodiments, concurrent (e.g., simultaneous) emission timing of the display unit 400 is adjusted, such that time between the left-eye image data L1 and the right-eye image data R1 (e.g., the time period from the beginning of L1 to the beginning of R1) is reduced to 4.15 ms or less. In this case, the flicker effect can be prevented, because time between the left-eye image data L1 and the right-eye image data R1 is reduced to 4.15 ms or less.

In other words, the timing control unit 310 adjusts the timing, such that a time interval between an emission period of a stereoscopic image L1 and R1 and an emission period of another stereoscopic image L2 and R2 (e.g., the time period from the end of R1 to the beginning of L1) can be longer than a time interval between each of the emission periods of the left-eye and right-eye image data forming one stereoscopic image L1 and R1 (e.g., the time period from the end of L1 to the beginning of R1).

The emission timing of the display unit 400 may be determined by an emission signal. Therefore, time between the emission period of the left-eye image data L1 and the emission period of the right-eye image data R1 (e.g., the time period from the beginning of L1 to the beginning of R1) can be reduced to 4.15 ms or less by adjusting the timing of the emission signal.

In some embodiments, the same image data is repeated for a series of frame like L1-R1 and L1-R1, and thus the problems of the crosstalk and low contrast can be solved.

Figure 5:
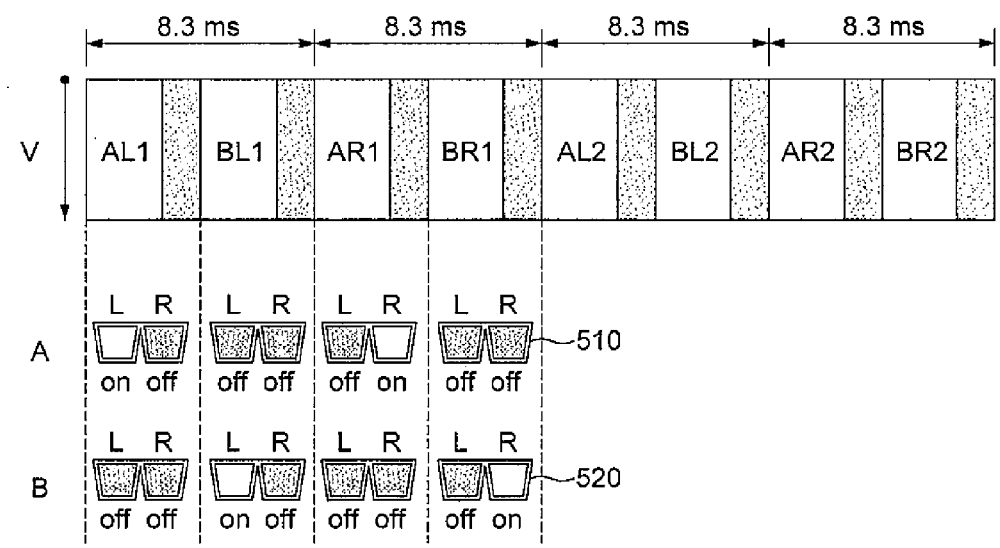
FIG. 5 is a timing chart illustrating a conventional method of organizing the 3D image data in a dual viewer 3D mode.

FIG. 5 is a timing chart illustrating a conventional method of organizing 3D image data in a dual viewer 3D mode. In more detail, FIG. 5 is a diagram illustrating a state where the 3D image data organized in the dual viewer 3D mode by a data formatter 330 is displayed on each frame of a display unit 400 driven by a concurrent (e.g., simultaneous) emission with active voltage method. In FIG. 5, x-axis represents time, whereas y-axis represents position in the vertical direction. The display unit 400 has a 240 Hz output frequency, and is driven by the concurrent (e.g., simultaneous) emission with active voltage method. Therefore, a frame period (4.15 ms) includes an emission period and a non-emission period.

In order to realize the dual viewer (A and B) 3D stereoscopic image, the data formatter 330 alternately organizes left-eye image data AL1, AL2 . . . and right-eye image data AR1, AR2 . . . to form the 3D image data, and then outputs the organized 3D image data to the display unit 400. The organized 3D image data is sequentially displayed on the display unit 400, and the shutter glasses 510 and 520 of each viewer A and B are operated in accordance with the 3D image data displayed on the display unit 400.

For example, the 3D image data is organized to have an arrangement of AL1-BL1-AR1-BR1-AL2-BL2-AR2-BR2, and is sequentially displayed on the display unit 400 having the 240 Hz output frequency, and thus the shutter glasses 510 and 520 of the viewers A and B are operated in accordance with the 3D image data displayed on the display unit 400.

That is, in a case where the left-eye image data AL1 for the viewer A is displayed, only a left shutter of the shutter glasses 510 of the viewer A is open, and a right shutter of the shutter glasses 510 of the viewer A and both shutters of the shutter glasses 520 of the viewer B are closed. Further, in a case where the left-eye image data BL1 for the viewer B is displayed, only the left shutter of the shutter glasses 520 of the viewer B is open, and the right shutter of the shutter glasses 520 of the viewer B and the both shutters of the shutter glasses 510 of the viewer A are closed.

Likewise, in a case where the right-eye image data AR1 for the viewer A is displayed, only the right shutter of the shutter glasses 510 of the viewer A is open, and the left shutter of the shutter glasses 510 of the viewer A and the both shutters of the shutter glasses 520 of the viewer B are closed. Further, in a case where the right-eye image data BR1 for the viewer B is displayed, only the right shutter of the shutter glasses 520 of the viewer B is open, and the left shutter of the shutter glasses 520 of the viewer B and the both shutters of the shutter glasses 510 of the viewer A are closed.

In a conventional 3D image data arrangement for realizing dual viewers (A and B) 3D stereoscopic image, time for which the viewer A remembers the left-eye image data AL1 and the right-eye image data AR1 is newly received is 8.3 ms. Likewise, time for which the viewer B remembers the left-eye image data BL1 and the right-eye image data BR1 is newly received is 8.3 ms. Therefore, the 3D stereoscopic image is operated at 120 Hz when each viewer A and B watches the 3D image.

Therefore, embodiments of the present invention describe a method and a device for reducing the time between the left-eye image data and the right-eye image data for each viewer by changing an output sequence of the 3D stereoscopic image data organized by the data formatter 330 or adjusting concurrent (e.g., simultaneous) emission timing of the display unit driven by the concurrent (e.g., simultaneous) emission with active voltage method. Further, if the time between the left-eye image data and the right-eye image data is reduced for each viewer, the flicker and depth distortion can be reduced.

Figure 6:
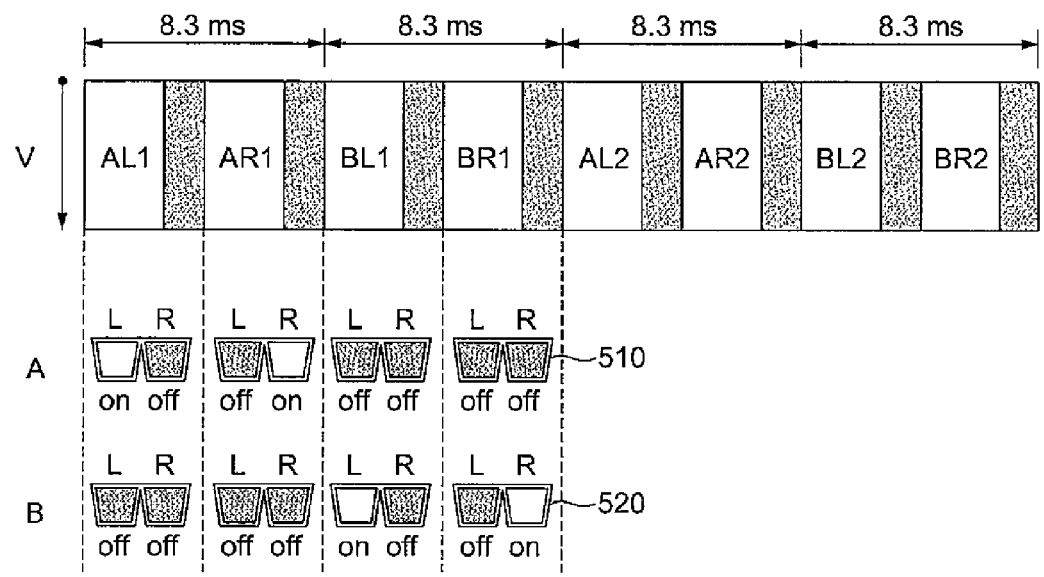
FIG. 6 is a timing chart illustrating a method of organizing the 3D image data in the dual viewer 3D mode according to an embodiment of the present invention.

FIG. 6 is a timing chart illustrating a method of organizing 3D image data in a dual viewer 3D mode according to an embodiment of the present invention. In more detail, FIG. 6 is a diagram illustrating a state where the 3D image data organized by a data formatter 330 is displayed on each frame of a display unit 400 driven by a concurrent (e.g., simultaneous) emission with active voltage method. In FIG. 6, x-axis represents time, whereas y-axis represents position in the vertical direction. A display unit 400 has a 240 Hz output frequency, and is driven by the concurrent (e.g., simultaneous) emission with active voltage method. Therefore, a frame period (4.15 ms) includes an emission period and a non-emission period.

In the dual viewers (A and B) 3D mode according to an embodiment of the present invention, the data formatter 330 organizes left-eye image data AL1, AL2 . . . and right-eye image data AR1, AR2 . . . for the viewer A, and left-eye image data BL1, BL2 . . . and right-eye image data BR1, BR2 . . . for the viewer B to have an arrangement of AL1-AR1-BL1-BR1-AL2-AR2-BL2-BR2, and the organized 3D image data is transmitted to the display unit 400. The organized 3D image data is sequentially displayed on the display unit 400 having a 240 Hz output frequency, and shutter glasses 510 and 520 of each viewer A and B are operated in accordance with the 3D image data displayed on the display unit 400.

In a case of the conventional dual viewer 3D image data arrangement of AL1-BL1-AR1-BR1-AL2-BL2-AR2-BR2, time between the left-eye image data and the right-eye image data (e.g., the time period from the beginning of AL1 to the beginning of AR1) is 8.3 ms for each viewer. To the contrary, in a case of the dual viewer 3D image data arrangement of AL1-AR1-BL1-BR1-AL2-AR2-BL2-BR2 according to an embodiment of the present invention, time between the left-eye image data and the right-eye image data (e.g., the time period from the beginning of AL1 to the beginning of AR1) is reduced to 4.15 ms for each viewer, such that flicker phenomenon can be prevented or reduced.

Figure 7:
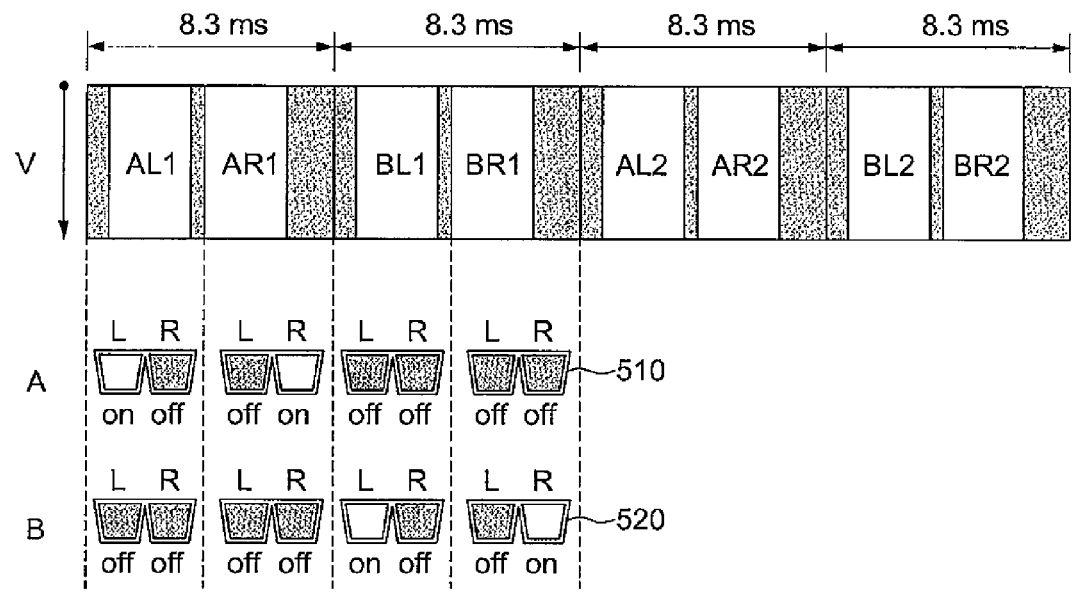
FIG. 7 is a timing chart illustrating a method of organizing the 3D image data in the single viewer 3D mode according to an embodiment of the present invention.

FIG. 7 is a timing chart illustrating a method of organizing 3D image data in a dual viewer 3D mode according to another embodiment of the present invention. In more detail, FIG. 7 is a diagram illustrating a state where the 3D image data organized by a data formatter 330 is displayed on each frame of a display unit 400 driven by a concurrent (e.g., simultaneous) emission with active voltage method. In FIG. 7, x-axis represents time, whereas y-axis represents position in the vertical direction. A display unit 400 has a 240 Hz output frequency, and is driven by the concurrent (e.g., simultaneous) emission with active voltage method. Therefore, a frame period (4.15 ms) includes an emission period and a non-emission period.

In the dual viewer 3D mode according to another embodiment of the present invention, the 3D image data is organized to have an arrangement of AL1-AR11-BL1-BR1-AL2-AR2-BL2-BR2, and the organized 3D image data is sequentially displayed on the display unit 400 having a 240 Hz output frequency, and shutter glasses 510 and 520 of each viewer A and B are operated in accordance with the 3D image data displayed on the display unit 400.

Further, time between the emission period of the left-eye image data AL1 and the emission period of the right-eye image data AR1 for the viewer A (e.g., the time period from the beginning of the emission period of AL1 to the end of the emission period of AL1) is reduced to 4.15 ms or less by adjusting timing of the emission signal. Likewise, time between the emission period of the left-eye image data BL1 and the emission period of the right-eye image data BR1 (e.g., the time period from the beginning of the emission period of BL1 to the end of the emission period of BL1) for the viewer B is reduced to 4.15 ms or less by adjusting the timing of the emission signal.

In other words, the timing control unit 310 adjusts timing, such that a time interval between an emission period of one stereoscopic image and an emission period of another stereoscopic image can be longer than a time interval between each of the emission periods of the left-eye and right-eye image data forming one stereoscopic image. For example, the timing controller may adjust timing, such that a time interval between each emission period of the image data perceived by each viewer can be longer than an interval between each emission period of the left-eye and right-eye image data perceived by one viewer.

The emission timing of the display unit 400 may be determined by an emission signal. Therefore, time between the emission period of the left-eye image data AL1 and the emission period of the right-eye image data AR1 for the viewer A (e.g., the time period from the beginning of the emission period of AL1 to the end of the emission period of AL1) can be reduced to 4.15 ms or less. Likewise, time between the emission period of the left-eye image data BL1 and the emission period of the right-eye image data BR1 for the viewer B (e.g., the time period from the beginning of the emission period of BL1 to the end of the emission period of BL1) can be reduced to 4.15 ms or less.

In this case, the flicker effect can be prevented, because the time period between the left-eye image data L1 and the right-eye image data R1 is reduced to 4.15 ms or less.

In some embodiments, the whole frame period is the same for each of the frames, and therefore, in a case where a time interval between the left-eye and the right-eye image data for the viewer A is reduced and a time interval between the left-eye and the right-eye image data for the viewer B is reduced, a time interval between the image data for the viewer A and the image data for the viewer B (e.g., the time period from the end of the emission period of AR1 to the beginning of the emission period of BL1) is consequently extended.

In this case, problems of crosstalk and low luminance occurring between the image data for the viewer A and the image data for the viewer B can be improved, because the time between the image data AL1 and AR1 of the viewer A and the time between the image data BL1 and BR1 for the viewer B (e.g., the time period from the end of the emission period of AR1 to the beginning of the emission period of BL1) are extended to 4.15 ms or more.

Figure 8:
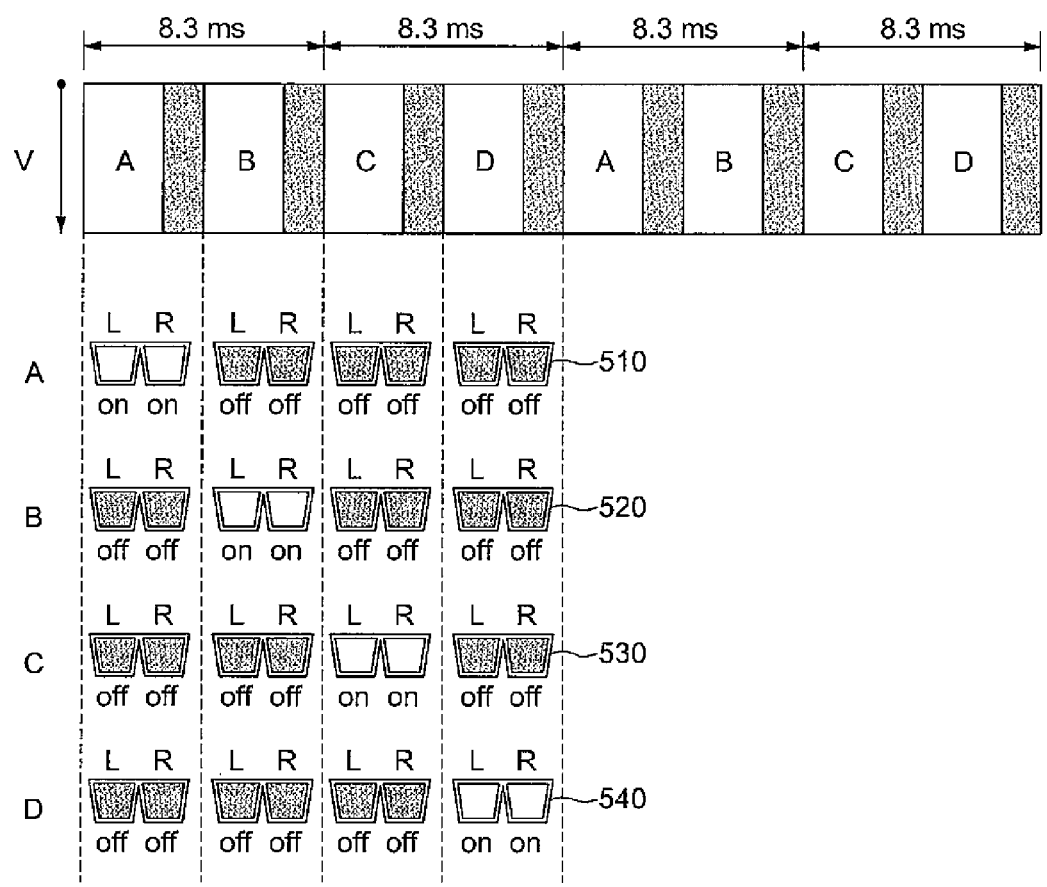
FIG. 8 is a timing chart illustrating a method of organizing image data in a quad viewer 2D mode according to an embodiment of the present invention.

FIG. 8 is a timing chart illustrating a method of organizing image data in a quad viewer 2D mode according to an embodiment of the present invention. In more detail, FIG. 8 is a diagram illustrating a state where quad viewers (A, B, C, and D) 2D image data is displayed in each frame of a display unit 400 driven by a concurrent (e.g., simultaneous) emission with active voltage method. In FIG. 8, x-axis represents time, whereas y-axis represents position in the vertical direction. A display unit 400 has a 240 Hz output frequency, and is driven by the concurrent (e.g., simultaneous) emission with active voltage method. Therefore, a frame period (4.15 ms) includes an emission period and a non-emission period.

In order to realize the quad viewer (A, B, C, and D) 2D stereoscopic image, image data for the viewer A, image data for the viewer B, image data for the viewer C, and image data for the viewer D are alternately organized to form the 2D image data, and the organized 2D image data is transmitted to the display unit 400. The organized 2D image data is sequentially displayed on the display unit 400 having a 240 Hz output frequency, and each of the shutter glasses 510, 520, 530, and 540 of each viewer is operated in accordance with the image data displayed on the display unit 400.

For example, the 2D image data is organized to have an arrangement of A-B-C-D-A-B-C-D, and is sequentially displayed on the display unit 400 having the 240 Hz output frequency, and thus the shutter glasses 510, 520, 530, and 540 are operated in accordance with the image data displayed on the display unit 400.

For example, in a case where image data for the viewer A is displayed, left-eye and right-eye shutters of the shutter glasses 510 of only the viewer A are open, and the other glasses 520, 530, and 540 of the viewers B, C, and D are closed. In a case where image data for the viewer B is displayed, left-eye and right-eye shutters of the shutter glasses 520 of only the viewer B are open, and the other glasses 510, 530, and 540 of the viewers A, C, and D are closed. In a case where image data for the viewer C is displayed, left-eye and right-eye shutters of the shutter glasses 530 of only the viewer C are open, and the other glasses 510, 520, and 540 of the viewers A, B, and D are closed. Further, in a case where image data for the viewer D is displayed, left-eye and right-eye shutters of the shutter glasses 540 of only the viewer D are open, and the other glasses 510, 520, and 530 of the viewers A, B, and C are closed.

According to the foregoing description, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:
1. A display device comprising:
 a signal processor configured to generate left-eye and right-eye image data according to an input image signal;
 a frame rate controller configured to generate a plurality of left-eye and right-eye image data from the left-eye and right-eye image data according to an output frequency;

a data formatter configured to alternately organize the plurality of left-eye and right-eye image data generated by the frame rate controller, wherein, when in a single viewer 3D mode, the data formatter organizes the plurality of left-eye and right-eye image data to be in an order of initial first-eye image data, initial second-eye image data, the initial first-eye image data, the initial second-eye image data, secondary first-eye image data, secondary second-eye image data, the secondary first-eye image data, the secondary second-eye image data;

a display unit configured to sequentially display the plurality of left-eye and right-eye image data organized by the data formatter; and a timing controller configured to determine timings to establish an emission period and a non-emission period in one frame, wherein the timing controller adjusts a first time period to be longer than a second time period, wherein the first time period is a time period from the end of second-eye image data of a first stereoscopic image to the beginning of first-eye image data of a second stereoscopic image, and the second time period is a time period from the end of first-eye image data of the first stereoscopic image or the second stereoscopic image to the beginning of the second-eye image data of the same stereoscopic image.

2. The display device of claim 1, wherein the display unit is configured to operate with a concurrent emission method in which one frame comprises the emission period and the non-emission period.

3. The display device of claim 2, wherein the timing controller is further configured to adjust a time interval between the emission period of the plurality of left-eye and right-eye image data perceived by a first viewer and the emission period of the plurality of left-eye and right-eye image data perceived by a second viewer to be longer than a time interval between the emission period of each left-eye and right-eye image data of the plurality of left-eye and right-eye image data perceived by the first viewer or the second viewer.

4. The display device of claim 1, further comprising shutter glasses configured to open and close shutters of the shutter glasses according to the plurality of left-eye and right-eye image data sequentially displayed on the display unit.

5. The display device of claim 4, wherein the shutter glasses comprise a mode selection unit configured to select from a 3D mode and 2D mode, and from a single mode, dual mode, and quad mode.

6. A method of driving a display device, the method comprising:

receiving an image signal;

generating left-eye and right-eye image data based on the received image signal;

generating a plurality of left-eye and right-eye image data from the left-eye and right-eye image data according to an output frequency;

alternately organizing the plurality of left-eye and right-eye image data according to an output format, wherein when in a single viewer 3D the plurality of left-eye and right-eye image data are organized in the following order: initial first-eye image data, initial second-eye image data, the initial first-eye image data, the initial second-eye image data, secondary first-eye image data, secondary second-eye image data, the secondary first-eye image data, the secondary second-eye image data; and sequentially displaying the organized plurality of left-eye and right-eye image data at a display unit, wherein the sequentially displaying the organized plurality of left-eye and right eye image data comprises adjusting a first time period to be longer than a second time period, wherein the first time period is a time period from the end of second-eye image data of a first stereoscopic image to the beginning of first-eye image data of a second stereoscopic image, and the second time period is a time period from the end of first-eye image data of the first stereoscopic image or the second stereoscopic image to the beginning of the second-eye image data of the same stereoscopic image.

7. The method of claim 6, wherein the sequentially displaying the organized plurality of left-eye and right-eye image data comprises adjusting a time interval between an emission period of the plurality of left-eye and right-eye image data perceived by a first viewer and an emission period of the plurality of left-eye and right-eye image data perceived by a second viewer to be longer than a time interval between the emission period of each left-eye and right-eye image data of the plurality of left-eye and right-eye image data perceived by the first viewer or the second viewer.

* * * * *